(12) United States Patent
Thiebaud

(10) Patent No.: US 9,139,048 B2
(45) Date of Patent: Sep. 22, 2015

(54) TREAD HAVING A TREAD PATTERN WITH INCISIONS

(75) Inventor: Philippe Thiebaud, Beaumont (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 2278 days.

(21) Appl. No.: 11/988,209

(22) PCT Filed: Jun. 30, 2006

(86) PCT No.: PCT/EP2006/063764
§ 371 (c)(1),
(2), (4) Date: Jan. 3, 2008

(87) PCT Pub. No.: WO2007/003610
PCT Pub. Date: Jan. 11, 2007

(65) Prior Publication Data
US 2009/0038723 A1 Feb. 12, 2009

(30) Foreign Application Priority Data
Jul. 5, 2005 (FR) ..................................... 05 07179

(51) Int. Cl.
*B60C 11/04* (2006.01)
*B60C 11/12* (2006.01)
*B60C 11/03* (2006.01)

(52) U.S. Cl.
CPC ............. *B60C 11/12* (2013.01); *B60C 11/0306* (2013.04); *B60C 11/04* (2013.01); *B60C 11/1218* (2013.04); *B60C 2011/129* (2013.04); *B60C 2011/1213* (2013.04)

(58) Field of Classification Search
CPC ................ B60C 11/04; B60C 11/1218; B60C 2011/129; B60C 2011/1213
USPC .............. 152/209.18, 209.21, 209.23, DIG. 3
See application file for complete search history.

(56) References Cited

U.S. PATENT DOCUMENTS

| 3,012,599 | A | * | 12/1961 | Benson et al. | ........... 152/209.22 |
| 3,199,567 | A | * | 8/1965 | Kunz et al. | ............... 152/209.18 |
| 5,783,002 | A | | 7/1998 | Lagnier | |
| 5,896,905 | A | * | 4/1999 | Lurois | ...................... 152/209.23 |
| 5,950,700 | A | | 9/1999 | Fukuoka | |
| 6,003,575 | A | | 12/1999 | Koyama et al. | |
| 6,484,772 | B1 | | 11/2002 | De Labareyre et al. | |
| 2004/0216826 | A1 | * | 11/2004 | Metzger | ................... 152/209.23 |

FOREIGN PATENT DOCUMENTS

| CA | 2018565 | * | 12/1990 |
| JP | 61-050805 | | 3/1986 |
| JP | 2002-046426 | * | 2/2002 |

* cited by examiner

*Primary Examiner* — Steven D Maki
*Assistant Examiner* — Robert Dye
(74) *Attorney, Agent, or Firm* — Dickinson Wright PLLC

(57) ABSTRACT

A tire tread includes at least one longitudinal rib limited by grooves. Each rib includes a plurality of incisions each opening into the grooves. Each incision has at least three parts at least two at least of these parts being of essentially transverse orientation and opening into the grooves. At least one other part is oriented essentially in the longitudinal direction. All parts of the incision of essentially longitudinal orientation are devoid any structure for blocking relative movement between the opposing faces of the incision. The parts of essentially transverse orientation include structure for limiting the amplitude of the relative movements of these faces at least in the direction of the thickness of the tread.

12 Claims, 2 Drawing Sheets

TREAD HAVING A TREAD PATTERN WITH INCISIONS

FIELD OF INVENTION

The invention relates to the field of treads in particular for tires for heavy vehicles, and more particularly to the tread patterns of these treads.

BACKGROUND OF INVENTION

In order to impart satisfactory grip performance on wet roads to the tires, it is known to provide each tread with a tread pattern formed of ribs of circumferential or longitudinal general orientation (that is to say, which may zigzag around this direction) and to provide these ribs with a plurality of incisions of low width compared with the width of the grooves (as a general rule, the average width of the incisions is at most 2 mm); these incisions are generally of transverse orientation, that is to say that the direction formed by a straight line passing through the end points of these incisions forms an angle other than 0° with the circumferential direction (generally greater than 40°). Each transverse incision may extend over only part of or over the entire useful thickness of the tread (by definition, the useful thickness of a tread corresponds to the tread thickness which it is possible to wear down while remaining within the legal regulations in force). Of course, the performance obtained is also linked to the nature of the materials selected for a tread: application to tires for heavy vehicles requires in particular materials having a wear performance compatible with the intended traveling distances.

However, conventional treads for tires for heavy vehicles comprising numerous incisions begin more or less quickly to exhibit wear located in the vicinity of the ridges of said incisions when used. "Localized wear" is to be understood here to mean that the wear does not uniformly affect the entire running surface of the tread but that there is more pronounced wear on some of parts of said running surface.

Although such wear is not detrimental from the point of view of performance during travel, it nevertheless remains that the time when it becomes necessary either to change the tire or to renew the tread may be reached more rapidly.

This wear is linked partly to a reduction in rigidity of the tread, this reduction in rigidity being in part linked to the possibility of the facing faces of material defining each incision sliding relative to each other when entering into contact with the roadway.

It has been proposed, in particular in Patent EP 768958 B1 (corresponding to Lagnier U.S. Pat. No. 5,783,002), to provide means for blocking the relative movements of the faces of material defining each incision. One embodiment of such blocking means consists of providing the faces with a plurality of undulations which engage with one another, these undulations extending in at least one direction. In order to limit or even block the relative movements between two faces defining an incision in the direction of the thickness of the tread (that is to say in a substantially radial direction when the tread is fitted on a tire), undulations are produced in the direction perpendicular to said direction.

It has however been noted that the wear performance could be improved further while retaining excellent grip performance.

There is a need for a tread pattern for a tire which is formed essentially of circumferential ribs provided with a plurality of incisions, of an average width of less than 2 mm, creating a large number of ridges and a great length of ridges, these incisions defining a plurality of rubber elements the facing walls of which block each other with virtually instantaneous effectiveness (that is to say with a very substantially reduced or even zero delay) and which do not generate localized wear (termed "irregular wear").

SUMMARY OF THE INVENTION

To this end, the invention proposes a tire tread having a tread pattern comprising: at least one longitudinal rib limited by grooves having the same orientation, each rib comprising a plurality of incisions of essentially transverse orientation and opening into the grooves defining said rib, on each rib, each incision, limited by faces of material which face one another, comprises at least three parts, two at least of these parts being of essentially transverse orientation (that is to say at least equal to 60° with the longitudinal direction of the tread) and opening into the grooves defining the longitudinal rib and forming the end parts of the incision, at least one third part being oriented essentially in the longitudinal direction (that is to say the trace of which on the running surface forms an average angle at most equal to 10° with the longitudinal direction).

The parts of the incision comprise on the faces of material which define them means for limiting the amplitude of the movements of one of these faces relative to the other at least in the direction of the thickness of the tread. This tread is characterized in that all the parts of the incision of essentially longitudinal orientation are totally devoid of any means of blocking the faces, be it in the direction of the thickness of the tread or in a direction transverse to the thickness of the tread, and in that each part of transverse general orientation is entirely offset in the longitudinal direction from any other part of transverse orientation of the same incision.

The longitudinal direction of a tread corresponds to the circumferential direction once a tire has been fitted with such a tread. The transverse direction corresponds to a direction perpendicular to the longitudinal direction and to the direction of the thickness of the tread.

A part of transverse general orientation is said to be "completely offset" in the longitudinal direction from any other part of transverse orientation of the same incision if all the points of said part are on the same side relative to a plane perpendicular to the longitudinal direction and all the points of the other parts of transverse general orientation are on the other side of this same plane.

In order to obtain the desired result, it is essential to have the combination mentioned further above, namely that all the parts of transverse general orientation are provided with means limiting the relative movements of the faces of material defining them at least in the direction of the thickness of the tread and there are between each of said parts of transverse general orientation incision parts with no limitation of the relative movements. Thus, on emerging from contact with the roadway, a first incision part of transverse general orientation will be freed from said contact without entraining the other incision parts of the same transverse general orientation, due to the presence of the parts of longitudinal general orientation without blockage or limitation of the relative movements. These parts of longitudinal general orientation in fact perform a decoupling role.

Advantageously, it is recommended to provide at least some of the incision parts of essentially transverse orientation with means for limiting the relative movements in the transverse direction of the facing faces defining the incision.

The means for limiting the amplitude of the relative movements of one face relative to the facing face in one direction may be selected from among the following variants:
- at least one undulation in the direction in which it is desired to reduce the movements,
- at least one relief element on a face cooperating with at least one relief element on the facing face (these relief elements possibly being cavities and protrusions).
- at least one rubber element linking the two opposing faces of one and the same transverse incision (as described in particular in patent EP 1007378 B1 (corresponding to De Labareyre et al. U.S. Pat. No. 6,484,772).

The relief elements (protrusions and cavities) may be of any geometric form; however, it is preferable for these forms to be similar so as to permit even more effective cooperation. It is of course possible to form solely protrusions on a wall defining an incision and to form solely cavities complementary with the protrusions on the opposite wall.

BRIEF DESCRIPTION OF THE DRAWINGS

Other characteristics and advantages of the invention will become apparent from the description given hereafter with reference to the appended drawings, which depict, by way of non-limitative examples, forms of embodiment of the subject of the invention.

In these drawings.

DESCRIPTION OF THE PREFERRED EMBODIMENTS

As used herein, a part of an incision which is of essentially or generally transverse orientation is one which forms an angle of at least 60° with the longitudinal direction XX', and a part of an incision oriented substantially or essentially in the longitudinal direction is one which forms an average angle of at most 10° with the longitudinal direction.

Figure 1:
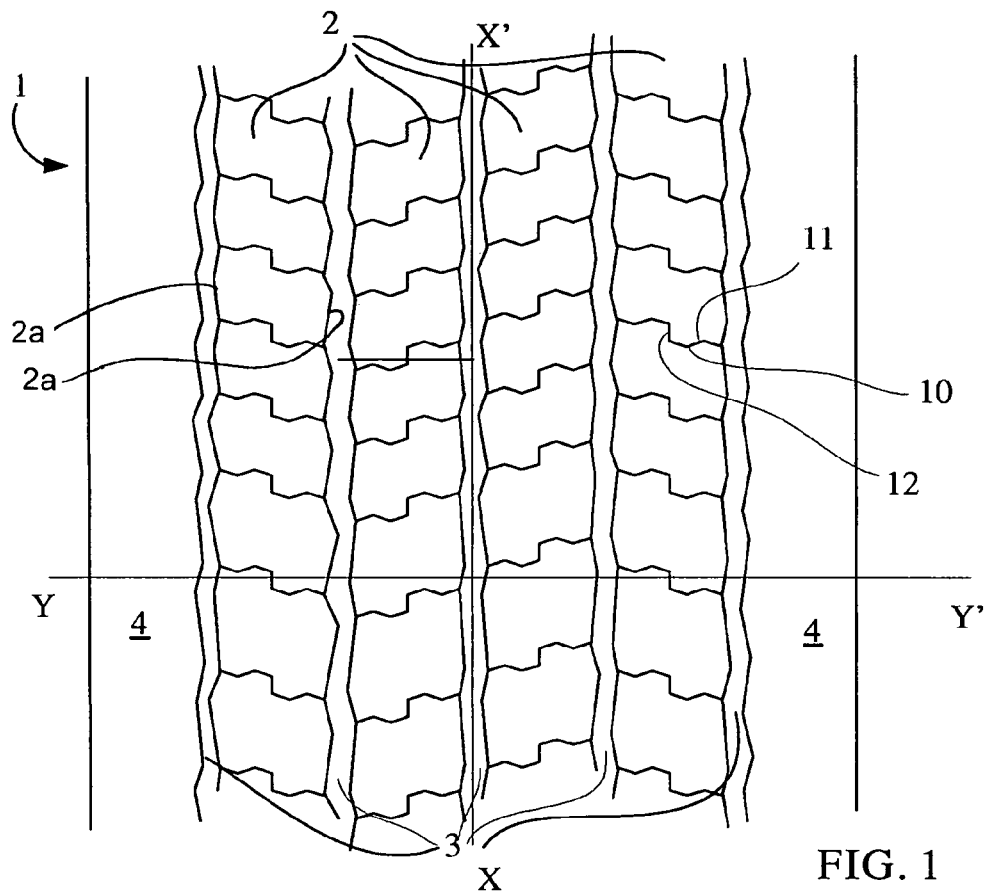
FIG. 1 is, according to a first variant, a plan view of a tread pattern of a tread of a tire according to the invention.

FIG. 1 depicts a partial view of a tread pattern 1 according to the invention for a heavy vehicle tire of dimension 11 R 22.5.

This tread pattern comprises five grooves 3 of circumferential general orientation defining six circumferential (longitudinal) ribs 2, 4, two of which form the edges 4 of the tread. Each rib 2 includes axially spaced edges 2a. On each rib, with the exception of the ribs forming the edges, there is provided a plurality of incisions 10 of transverse general orientation, forming on average an angle equal to 70° in absolute value with the longitudinal direction (marked by the direction XX' in the drawings). On some of the ribs this angle has a positive sign and on the others a negative sign.

The grooves have an average width of 6 mm and a depth of 16 mm.

The incisions have an average width of 0.6 mm and have the same depth as the grooves.

Figure 3:
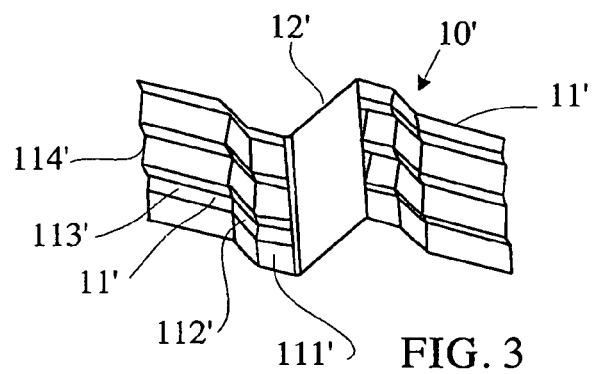
FIG. 3 depicts a lamella fitted in a mould for molding the incision shown in FIG. 2.

Each incision 10 is formed of a plurality of portions of incisions: a central portion 12 of longitudinal orientation surrounded on each side by a portion 11 of transverse general orientation. The portions of transverse general orientation 11 comprise on the faces of material defining them a plurality of zigzags in the direction of the depth (that is to say in the thickness of the tread), as can be seen in FIG. 3, which depicts in section a lamella intended for molding an incision of this type.

Figure 2:
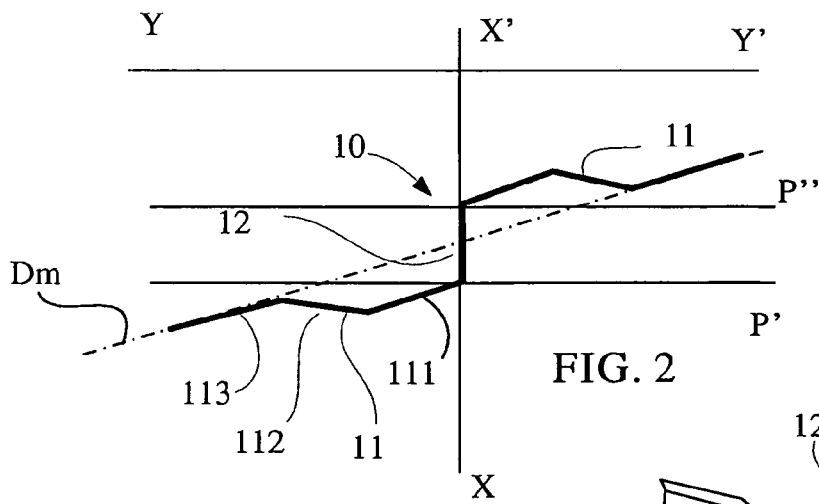
FIG. 2 depicts a view of the trace on the running surface of an incision formed on the tread pattern of FIG. 1.

In FIG. 2, which depicts the trace of the incision 10 on the running surface of the tread, it can be seen that in addition to the zigzags in the direction of the depth each part of transverse general orientation comprises zigzags in the transverse direction 111, 112, 113. Thus, each of the generally transverse portions 11 is bordered at one axial end by a longitudinal portion 12 and at the other axial end by either a substantially longitudinal portion 12 or a rib edge 2a.

The average orientation of the incision 10 is given by the angle formed by the straight line Dm passing through the ends of the incision on the edges of the rib 2 in which this incision is molded.

According to this arrangement, the rigidity of the tread, even if greatly incised, is kept at an appropriate level on entering into contact with the ground, owing to the mechanical blocking produced by the zigzags present in the direction of the thickness and the transverse direction. Furthermore, during travel, a first part of transverse general orientation emerges from the region of contact with the ground without the second part of transverse general orientation being adversely affected thereby, the intermediate region of longitudinal orientation devoid of blocking means for the relative movements between the faces defining this part acting as a decoupling means between said parts of transverse general orientation.

In order to obtain optimum decoupling between the intermediate region of longitudinal general orientation and the parts of transverse general orientation, it is preferable for the parts of transverse orientation to be located entirely outside the volume defined by the two planes P' and P'' parallel to the axial direction YY' of the tread and perpendicular to the outer surface of the tread (corresponding to the running surface) and passing respectively through the ends longitudinally farthest from the intermediate region (as shown in FIG. 2).

FIG. 3 shows a blade 10' for fitting in a tread mould. This blade comprises two end parts 11' surrounding an intermediate part 12', the latter part 12' forming an angle equal to 90 degrees with each end part 11'. Furthermore, each end part comprises three facets 111', 112', 113', each of said facets comprising a plurality of undulations in the direction of the height of the blade. When combined, the facets and the undulations make it possible to effect mechanical blocking of the walls of the incision molded with such a blade. To meet the essential conditions of the invention, the intermediate part is totally devoid of any blocking means. In one variant, not shown, provision may be made to increase slightly the thickness of this intermediate part so as to improve still further the decoupling between the opposing faces of the incision molded by this part.

Running tests under conditions which reproduce actual running conditions have made it possible to evaluate the improvement in the wear performance provided by tires according to the invention, compared with tires of the same dimension which comprise only a plurality of transverse incisions without any blocking element. The improvement in the irregular wear performance was quantified by the very significant reduction in the number of rotations of the tires on the test vehicles. The rotation of the tires on a vehicle consists of rotating the tires of the front axle with those of the rear axle when the irregular wear which has appeared on the front axle reaches a predetermined threshold requiring such an operation in order to make the wear more regular. For the reference tires, the rotation of the tires on a heavy vehicle is effected for a mileage of between 50,000 and 150,000 km. A majority of the tires according to the invention did not require rotation before 200,000 km, some tires even attaining a distance of 300,000 km. The impact of this improvement in terms of irregular wear also made it possible to improve very substantially the total life of the tire (measured by the total distance traveled before complete wear of the tire necessitating its replacement). The average gain in terms of mileage on all the tires according to the invention is of the order of 30%.

Figure 4:
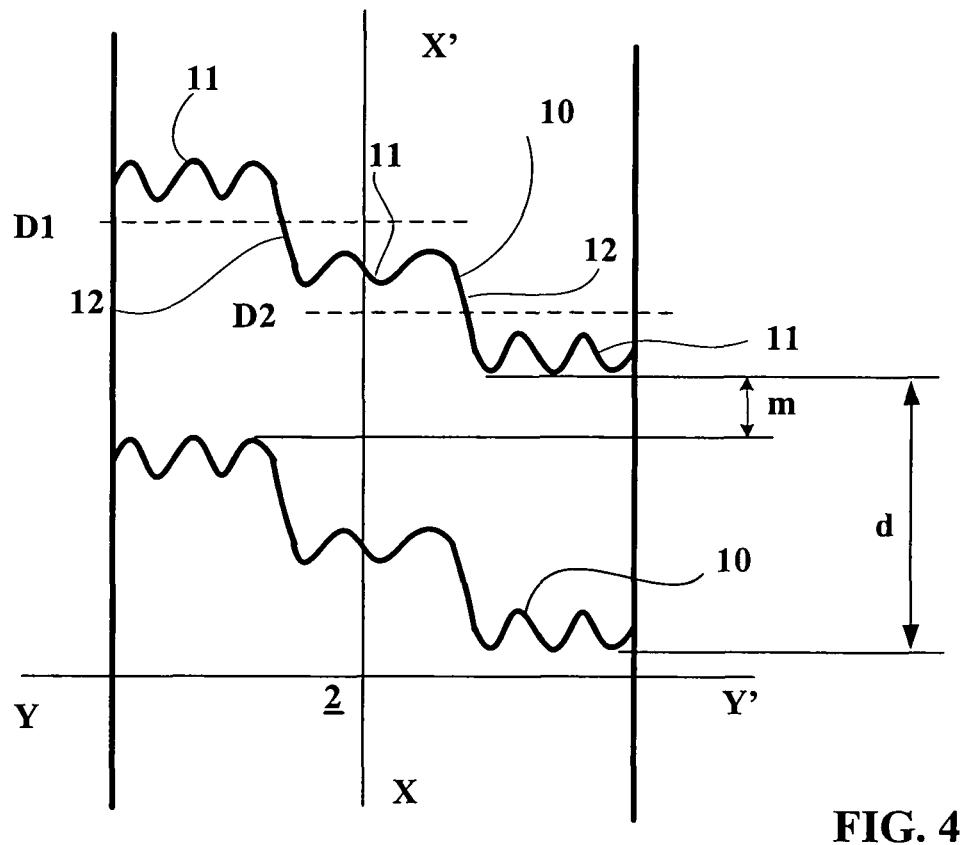
FIG. 4 depicts a partial view of a rib of a tread provided with a plurality of incisions according to the invention.

FIG. 4 depicts a partial view of a tread of a tread pattern variant according to the invention. A rib 2 is shown and comprises a plurality of incisions 10 passing through the whole rib. Each incision comprises three parts 11 of transverse general orientation separated two by two by a part 12 of substantially longitudinal orientation (in the present case these parts 12 form an angle of 10° with the longitudinal direction XX' of the rib). Thus, a middle one of the parts 11 is bordered at each axial end by a generally longitudinal part 12. The middle part 11 lies axially between the two remaining end parts 11, each of which is bordered at one axial end by a substantially longitudinal part 12 and at the other axial end by a rib edge 2a.

The three parts 11 are staggered in the same direction. All the points of the trace of a first part 11 are located on the same side relative to a plane perpendicular to the longitudinal direction (having as trace a straight line D1 parallel to the transverse direction YY' of the rib), whereas all the points of another part 11 of the same incision are located on the other side relative to this same plane. The same applies to the third part 11, which is located entirely on one and the same side relative to a plane perpendicular to the longitudinal direction (having as trace a straight line D2 parallel to the transverse direction of the rib), whereas all the points of the other parts are located on the other side relative to this plane.

Furthermore, it is advantageous for there not to be any overlap between two incisions, that is to say that there must be a space of a dimension other than zero in the longitudinal direction between the closest points between said incisions (this distance is marked "m" in FIG. 4).

Preferably the circumferential length of each incision part of longitudinal general orientation is between 15% and 35% of the pitch of the tread pattern, the pitch of the tread pattern being defined as the average distance d between two successive incisions.

In another variant of incisions according to the invention, provision may be made for the parts of transverse general orientation to be provided with a plurality of relief elements protruding from a face and recessed on the facing face, the recesses cooperating with the protrusions to block the relative movements of said faces.

Figure 5:
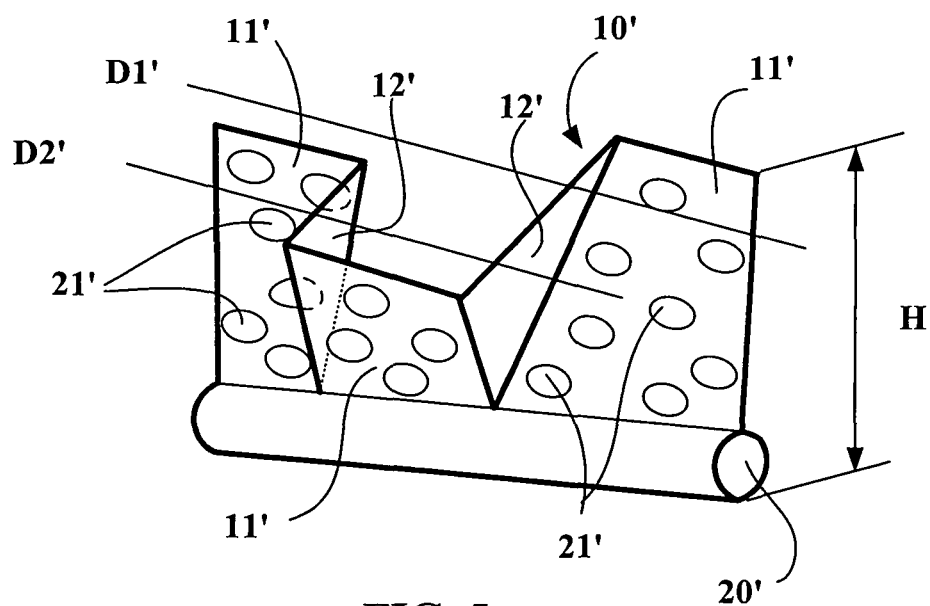
FIG. 5 shows a variant of a lamella molding an incision according to the invention.

Such an example is shown in FIG. 5, in which there can be seen a blade making it possible to mould an incision in a tread.

According to this FIG. 5, a blade 10' for molding an incision comprises two parts 12' of longitudinal orientation which are devoid of means for blocking the relative movements of the faces of the facing incision, whereas the other three faces 11' of transverse general orientation are provided with a plurality of protuberances 21'. These blade parts are intended for molding recesses and bumps on the walls of the incision so that the bumps of one wall interact with the recesses of the opposing wall. Furthermore, one of the ends of the blade is formed of a substantially rectilinear bulge 20' of circular cross-section for molding a channel at the bottom of the incision.

The parts 11' in the present case are arranged offset relative to each other (the traces D1' and D2' correspond to radial planes containing the bulge 20').

As a variant, it is possible to provide for the average orientation of the incisions, that is to say the orientation formed by a direction passing through the ends of each incision, to be at most equal to 10°.

The invention is not limited to the examples described and illustrated, and various modifications can be made thereto without departing from the scope thereof. In particular, it is possible to incline the incisions such that each incision forms an angle other than 0° with a radial plane, that is to say a plane containing the axis of rotation.

In particular, what has been described relates to treads which may be subject to specific commercial distribution or alternatively to tires having such treads, these tires being intended to be sold individually or alternatively in the form of equipment for heavy vehicles.

The invention claimed is:

1. A tire tread comprising a rib extending in the longitudinal direction of the tread, the rib delimited by axially spaced grooves of the tread and having axially spaced longitudinal edges at respective said grooves, the rib including a plurality of incisions each extending from one rib edge to the other, each incision formed by opposing faces of tread material; each incision comprising at least three parts, two of the parts constituting essentially transverse parts oriented at an angle of at least 60° to the tread's longitudinal direction and opening into respective said grooves; another of the parts constituting an essentially longitudinal part forming an average angle of no more than 10° with the tread's longitudinal direction; each essentially transverse part being bordered at one of its ends by an essentially longitudinal part and at another of its ends by one of a rib edge or an essentially longitudinal part; wherein:

the essentially longitudinal part being devoid of means for blocking relative movement between the opposing faces thereof in the thickness direction of the tread and in a direction transverse to the thickness direction;

each essentially transverse part including, on the respective opposing faces thereof, a blocking structure for limiting the amplitude of relative movement between such walls at least in the thickness direction of the tread, and comprising at least one undulation, zigzag, or relief elements engageable with one another, extending in the thickness direction of the tread;

each essentially transverse part being entirely offset in the tread's longitudinal direction from any other essentially transverse part of the same incision; and a minimum distance between the essentially transverse parts of the same incision is between 15% and 35% of the average distance between successive incisions.

2. The tire tread according to claim 1 wherein there is a plurality of longitudinal ribs, each delimited by longitudinal grooves and including said incisions.

3. The tire tread according to claim 1 wherein each incision has only two said essentially transverse parts and only one essentially longitudinal part.

4. The tire tread according to claim 1 wherein each incision has more than two essentially transverse parts and more than one essentially longitudinal part.

5. The tire tread according to claim 1 wherein the opposing faces of said essentially transverse parts include blocking structure for limiting relative movement therebetween in a direction transversely of the tread's longitudinal direction.

6. The tire tread according to claim 1 wherein the blocking structure comprises at least one undulation extending in the tread's thickness direction.

7. The tire tread according to claim 1 wherein the blocking structure comprises at least one zigzag extending in the tread's thickness direction.

8. The tire's tread according to claim 1 wherein the blocking structure includes relief elements disposed on respective opposing faces and which are engageable with one another.

9. The tire tread according to claim 1 wherein the essentially longitudinal part extends at an angle of 0° to the tread's longitudinal direction, and the opposing faces thereof are devoid of the blocking structure.

10. The tire tread according to claim 1 wherein an orientation of each incision is defined by an angle formed between the tread's longitudinal direction and a line extending through the opposite ends of the incision, the average orientation of the incisions of the rib being at most 10°.

11. The tire tread according to claim 1 wherein the essentially transverse parts of each incision are located outside of a region defined between two planes P' and P''' which extend through respective ends of the essentially longitudinal part in a direction parallel to the tread's axis and perpendicular to the tread's running surface.

12. A tire comprising the tread according to claim 1 and adapted for a heavy vehicle.

* * * * *